Nov. 2, 1948. P. STAHELI 2,452,800
FOOT SCRAPER
Filed May 3, 1944 3 Sheets-Sheet 2

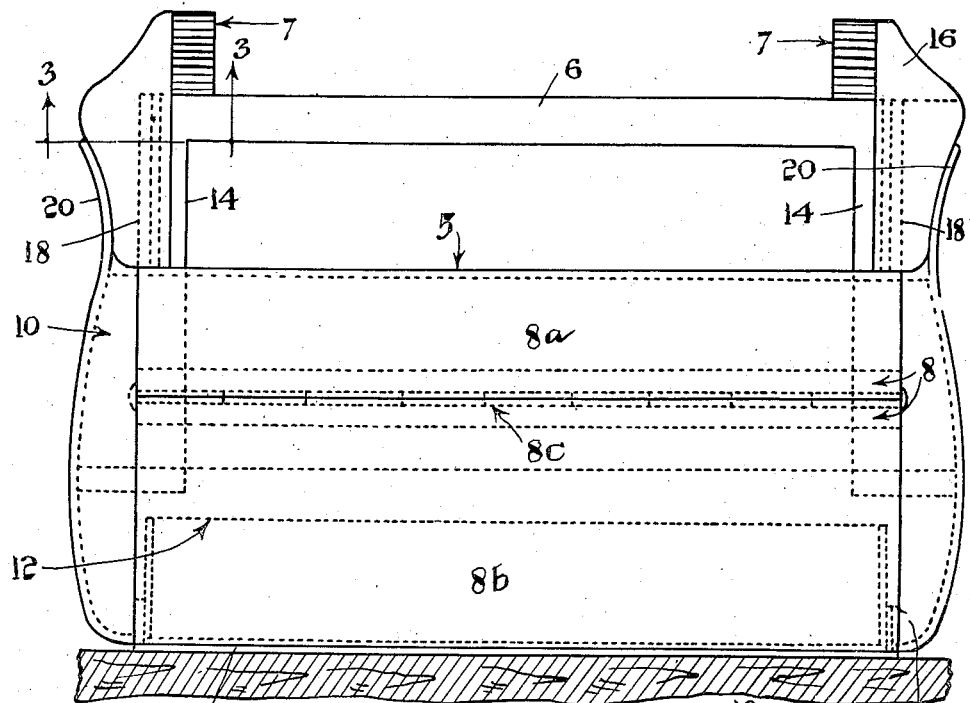
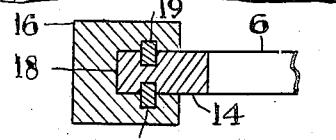
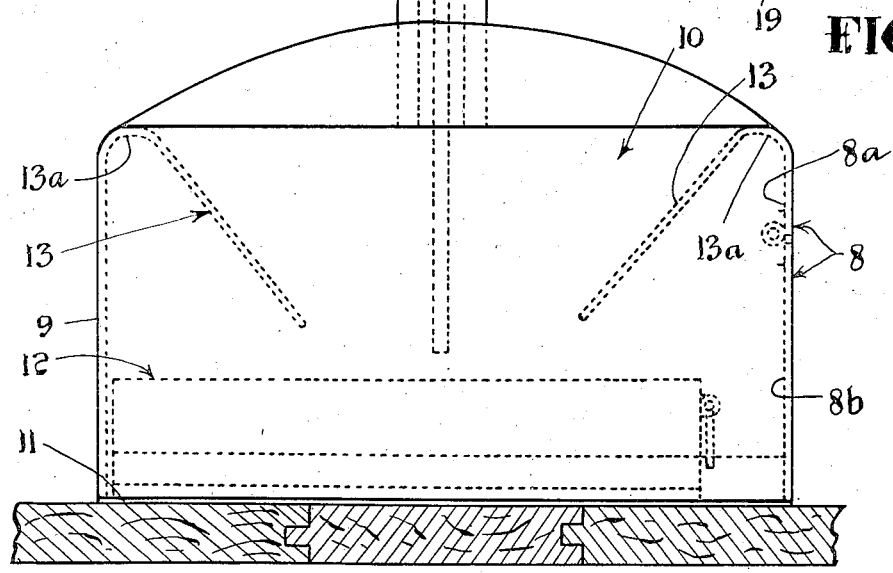

INVENTOR
PAUL STAHELI
BY Featherstonhaugh & Co.
ATTORNEYS

Nov. 2, 1948.   P. STAHELI   2,452,800
FOOT SCRAPER

Filed May 3, 1944   3 Sheets—Sheet 3

INVENTOR
PAUL. STAHELI
BY Featherstonhaugh &Co.
ATTORNEYS

Patented Nov. 2, 1948

2,452,800

UNITED STATES PATENT OFFICE 2,452,800

FOOT SCRAPER

Paul Staheli, Arvida, Quebec, Canada

Application May 3, 1944, Serial No. 533,899

2 Claims. (Cl. 15—237)

This invention relates to improvements in shoe-cleaning scrapers and consists in certain novel features and combinations of features set forth in the following detailed description of the accompanying drawings, in which:

Fig. 1 is a front view of a preferred form of shoe-cleaning scraper assembly provided in accordance with my invention.

Fig. 2 is an end view of the assembly shown in Fig. 1.

Fig. 3 is a detailed sectional view taken substantially along the section line 3—3 of Fig. 1.

Figure 4:
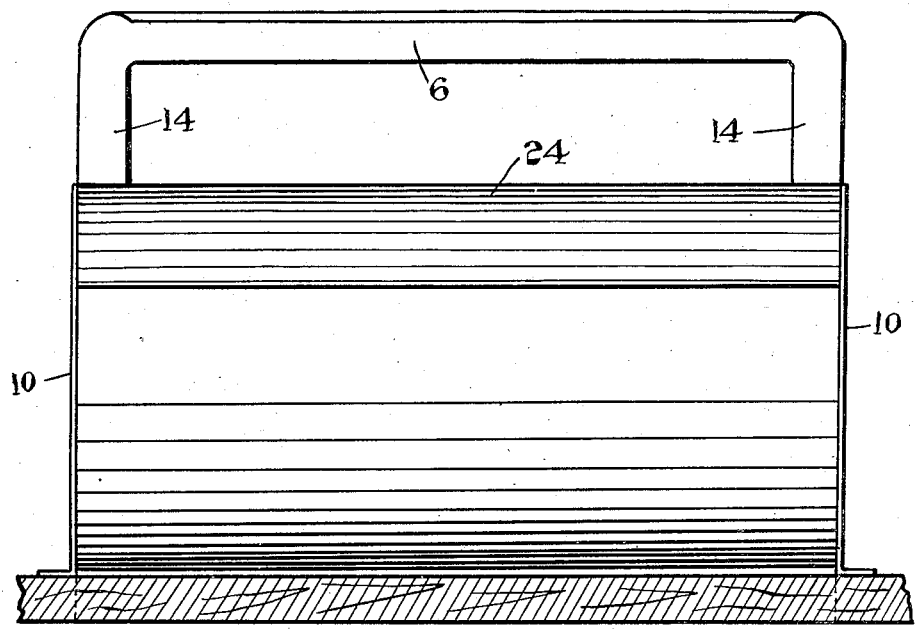
Fig. 4 is a view similar to Fig. 1 but showing a modified assembly.

The assembly shown in Figs. 1 to 3 inclusive comprises an open-top mud-receiving casing 5, a scraper blade 6 and a pair of brushes 7.

The casing 5 is here shown as comprising a sheet metal casing including front and rear walls 8 and 9, end walls 10 and a bottom wall 11. The front casing wall 8 comprises upper and lower sections 8a and 8b fastened together by a hinge connection 8c so that the lower section 8b serves as a door controlling a front opening through which a removable mud and dirt-receiving tray 12 is inserted in the lower portion of the casing or removed therefrom.

Downwardly and inwardly inclined deflecting walls 13 are formed integral with the upper edges of the front and rear walls 8 and 9 and serve to deflect mud and dirt falling from the scraper blade 6 into the tray 12.

The scraper blade 6 is supported above and parallel with the casing walls 8 and 9 by means of two downwardly directed terminal extensions 14 which are preferably soldered or otherwise secured to the end casing walls 10.

The brushes 7 overlie opposite ends of scraper blade 6 and are carried by removable brush holders 16. As here shown each holder 16 is formed with a vertical groove 18 in which one of the terminal extensions 14 of scraper blade 6 is slidably fitted so that the brush holder may be removed by raising it to a position clear of the scraper blade. The scraper blade extensions 14 are preferably keyed to the brush holders as indicated at 19 to restrain the brush holders against horizontal outward movement relative to said extensions. The end casing walls 10 are formed with integral upwardly directed spring extensions 20 which press against the brush holders 16 to prevent casual vertical displacement thereof.

In prior art arrangements in which a scraper blade is positioned above and intermediate the front and rear walls of a mud and dirt-receiving casing there have been numerous instances of injuries caused by the sharp or thin upper edges of said walls. The assembly shown in Figs. 1 to 3 inclusive eliminates this objection by reason of the fact that the deflectors 13 are integrally joined to the upper edges of the front and rear casing walls 8 and 9 by rounded connecting portions 13a. The assembly shown in Figs. 1 to 3 inclusive also presents a neat and attractive appearance as compared with the unsightly arrangements heretofore provided for the same purpose.

Figure 5:
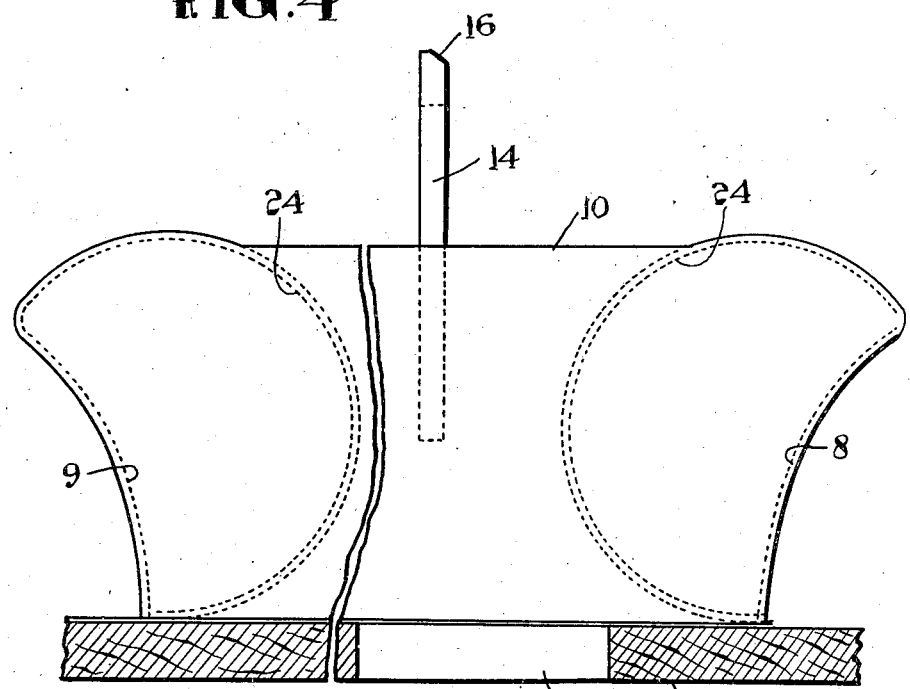
Fig. 5 is an end view of the assembly shown in Fig. 4.

In the modified construction shown in Figs. 4 and 5, the front and rear walls 8 and 9 are slightly curved so that their outer surfaces are concave and the deflecting walls 13 are replaced by semi-circular deflecting walls 24 having their convexly curved surfaces opposed to each other. The deflecting walls 24 are formed integral with the upper edges of the front and rear casing walls 8 and 9 and are arranged so that their lower edges terminate immediately adjacent the lower edges of said front and rear casing walls. The scraper blade 6 shown in Figs. 4 and 5 is the same as that previously described and may be similarly equipped with the previously mentioned brushes 7 and brush holders 16. The casing shown in Figs. 4 and 5 is not provided with a bottom wall since this type of casing is adapted to be arranged over a dirt-receiving hole 25 provided in the floor of a porch or other supporting surface, the dirt and mud falling from the scraper blade 6 being directed toward the hole 25 by the curved deflecting walls 24.

Figure 6:
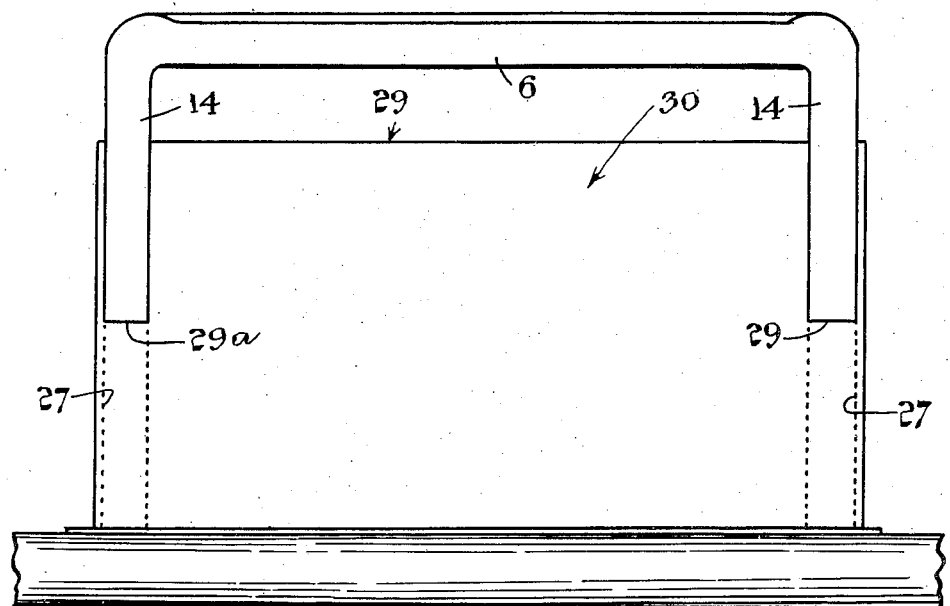
Fig. 6 is a front view of a further modification.
Figure 7:
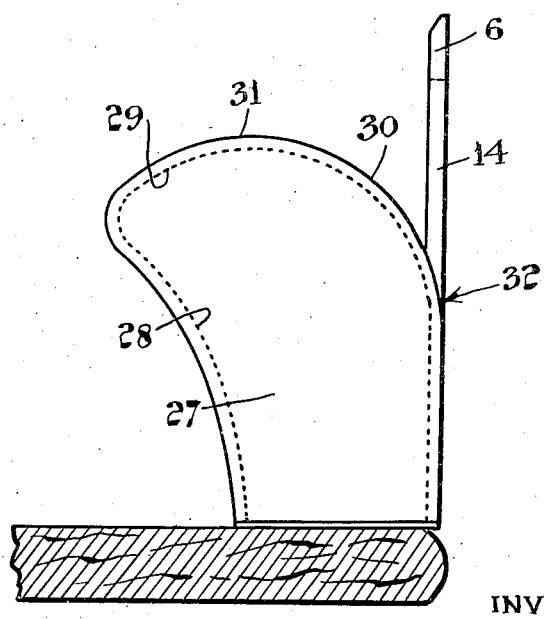
Fig. 7 is an end view of the assembly shown in Fig. 6.

In the arrangement shown in Figs. 6 and 7, the scraper 6 is mounted on a supporting structure comprising end walls 27, rear wall 28 and deflecting wall 29. The deflecting wall 29 is formed with a curved deflecting surface 30 curving forwardly and downwardly from an intermediate point 31 located rearwardly of the scraper 6 to a point 32 located directly below said scraper. That portion of deflecting wall 29 which lies below the point 32 extends downwardly in a substantially straight line and terminates in a lower edge which is flush with the lower edges of the end walls 27. From the point 31 the deflecting wall 29 curves rearwardly and downwardly to the upper edge of the rear wall 28 to which the deflecting wall is joined. The downwardly directed terminal extensions 14 of the scraper blade 6 shown in Figs. 6 and 7 are passed through openings 29a of the deflecting wall 29 and secured to the end walls 27. The assembly shown in Figs. 6 and 7 is adapted to be arranged on the edge of a porch floor or step 33 as shown in Fig. 7.

All the various modifications described in the foregoing have the common feature of a deflecting wall which extends forwardly and downwardly from the upper rear corner portions of the side walls to which the scraper blade 6 is mounted. In the assembly shown in Figs. 4 and 5 the front and rear walls 8 and 9 may be omitted since these walls, while preferably provided to close off the space bounded by the concave sides of the deflectors 24 and give the device a more pleasing and finished appearance, are not absolutely necessary. Likewise, the rear wall 28 shown in Fig. 7 is not essential and may, if desired, be omitted.

Having thus described what I now conceive to be the preferred embodiments of this invention, it will be understood that various modifications may be resorted to within the scope and spirit of the invention as defined by the appended claims.

I claim:

1. A shoe cleaning scraper assembly including an open top casing comprising a bottom wall and vertically extending front, rear and end walls, a scraper blade provided with downwardly directed extensions secured to the end walls of said casing to support the scraper blade in an elevated position above the upper edges of the front and rear walls, and a pair of brush holders provided with vertical grooves in which the outer edge portions of the downwardly directed extensions of the scraper blades are slidably fitted so that the brush holders may be removed by sliding them upwardly to a position clear of the scraper blade, the end walls of said casing being provided with spring extensions bearing against the brush holders to retain them against casual displacement and brushes mounted on said brush holders and overlying opposite ends of the scraper blade.

2. A shoe cleaning scraper assembly of the character described including a horizontal upwardly directed scraper blade provided with downwardly directed terminal extensions, a brush holder removably associated with each of said extensions, said brush holders being provided with grooves in which the outer portions of said extensions are slidably fitted so that the brush holders may be removed from said extensions by sliding them upwardly above the scraper blade, spring members arranged to bear against the outer sides of the brush holders and to press them against said extensions to thereby resist accidental displacement of said brush holders, and brushes carried by said brush holders and overlying the upper edge of the scraper blade.

PAUL STAHELI.

REFERENCES CITED

The following references are of record in the file of this patent:

UNITED STATES PATENTS

| Number | Name | Date |
|---|---|---|
| 185,278 | Ash | Dec. 12, 1876 |
| 613,133 | Fobare | Oct. 25, 1898 |
| 618,759 | Yeo | Jan. 31, 1899 |
| 894,218 | Lincoln | July 28, 1908 |
| 1,045,518 | Connor | Nov. 26, 1912 |
| 1,703,262 | Curtis | Feb. 26, 1929 |

FOREIGN PATENTS

| Number | Country | Date |
|---|---|---|
| 101,395 | Germany | Feb. 6, 1899 |
| 4,366 | Great Britain | Feb. 22, 1909 |
| 26,895 | Great Britain | Nov. 19, 1910 |